United States Patent [19]

Lewis

[11] 4,169,283

[45] Sep. 25, 1979

[54] STEP-CONTROL OF ELECTROMECHANICAL SYSTEMS

[75] Inventor: Robert N. Lewis, Clarendon Hills, Ill.

[73] Assignee: The United States of America as represented by the United States Department of Energy, Washington, D.C.

[21] Appl. No.: 784,400

[22] Filed: Apr. 4, 1977

[51] Int. Cl.$^2$ ............................................. G06G 7/48
[52] U.S. Cl. ..................................... 364/118; 364/105; 364/117
[58] Field of Search ............... 364/105, 106, 107, 117, 364/121, 118, 828; 176/19 EC, 24

[56] References Cited

U.S. PATENT DOCUMENTS

| 3,287,615 | 11/1966 | Smyth | 235/150.1 X |
| 3,671,725 | 6/1972 | Bakke | 364/121 |
| 3,798,426 | 3/1974 | Bristol | 364/117 |

OTHER PUBLICATIONS

Bristol et al., Adaptive Process Control, by Pattern Recognition, Instr. and Control Systems, vol. 43/3, Mar. 1970, pp. 101-105.
Moore et al., Improved Algorithm for Direct Digital Control, Instruments and Control Systems, vol. 43/1, Jan. 1970, pp. 70-74.
"Fast Retrace Optical Scanning", by Brosens in Electro-Optical Systems Design, pp. 21-24, Apr. 1971.

Primary Examiner—Felix D. Gruber
Attorney, Agent, or Firm—Dean E. Carlson; Frank H. Jackson; Donald Reynolds

[57] ABSTRACT

The response of an automatic control system to a general input signal is improved by applying a test input signal, observing the response to the test input signal and determining correctional constants necessary to provide a modified input signal to be added to the input to the system. A method is disclosed for determining correctional constants. The modified input signal, when applied in conjunction with an operating signal, provides a total system output exhibiting an improved response. This method is applicable to open-loop or closed-loop control systems. The method is also applicable to unstable systems, thus allowing controlled shut-down before dangerous or destructive response is achieved and to systems whose characteristics vary with time, thus resulting in improved adaptive systems.

15 Claims, 25 Drawing Figures

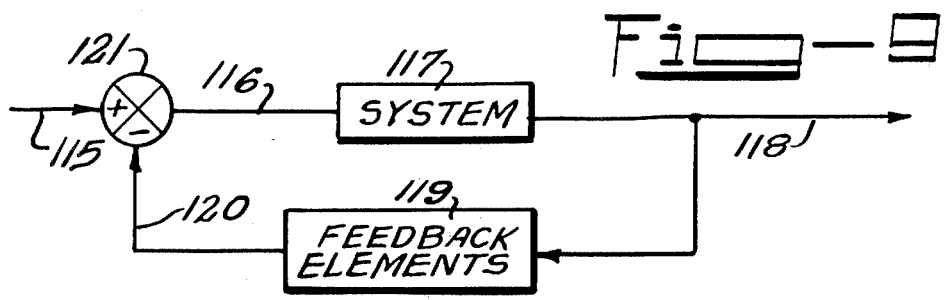
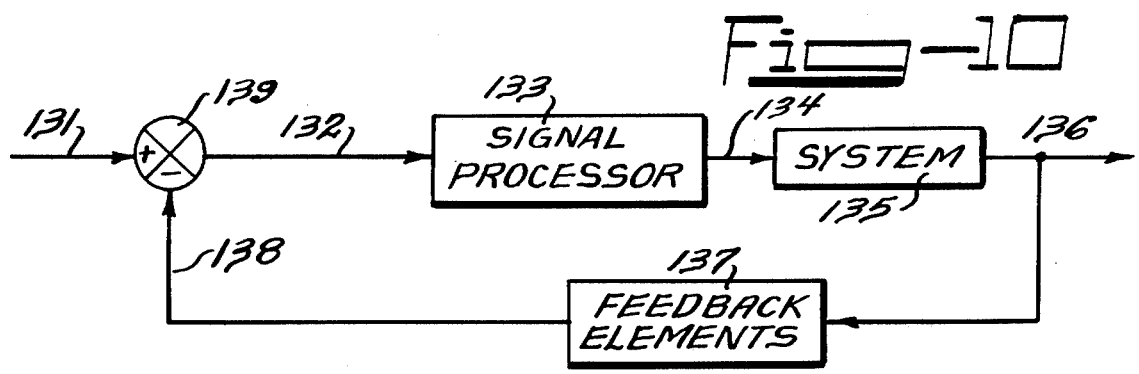
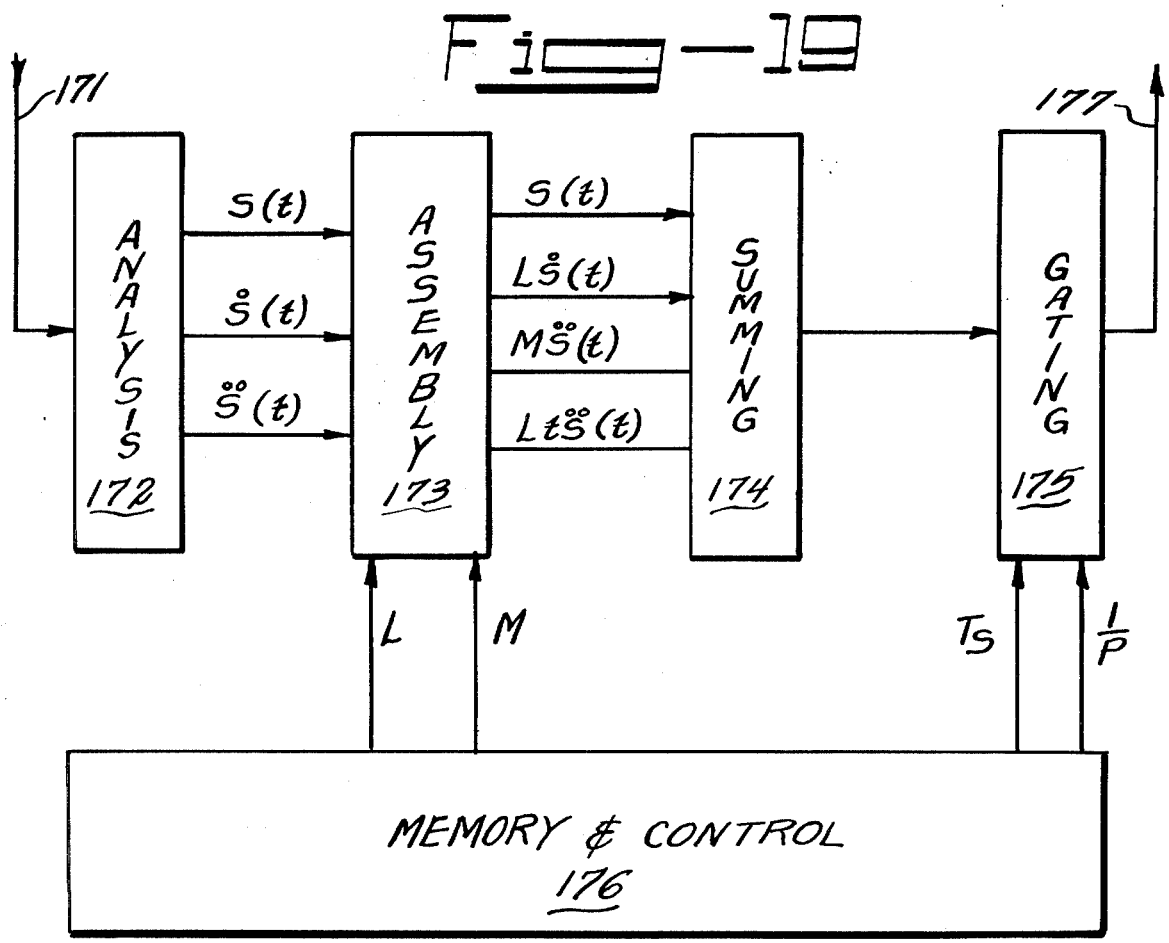

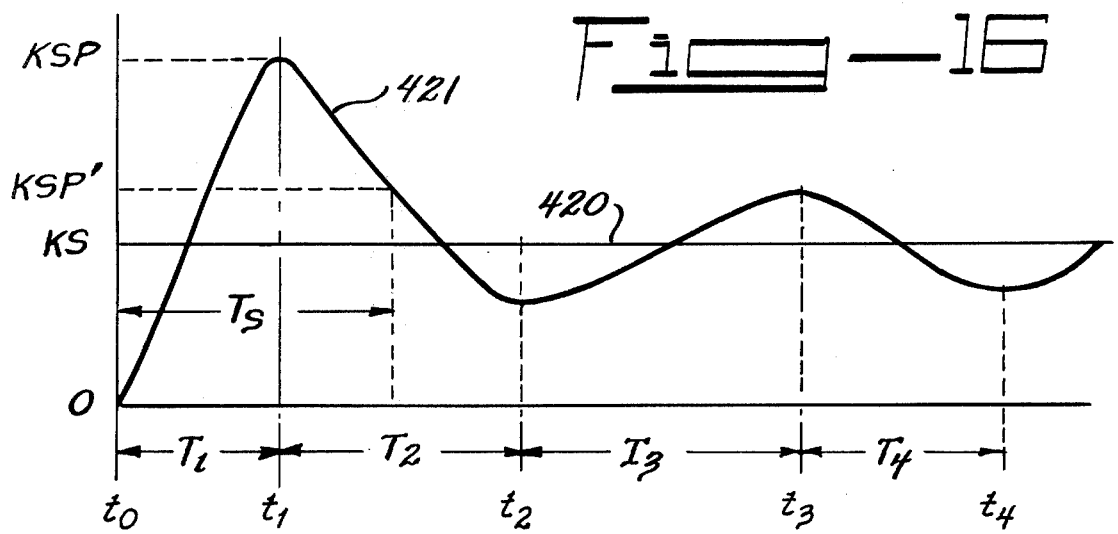
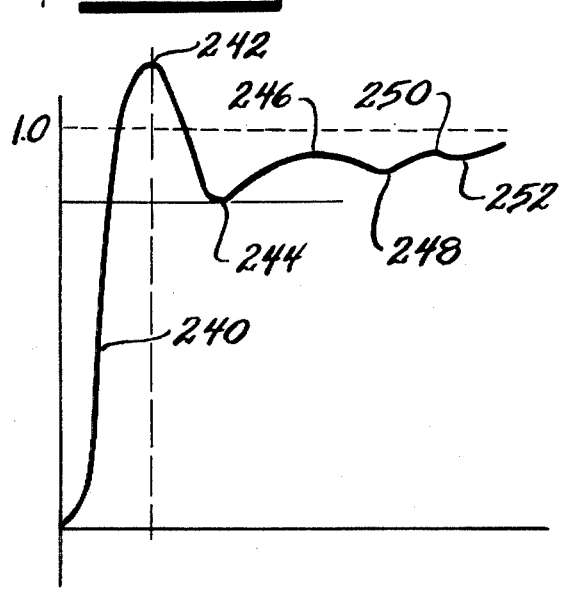
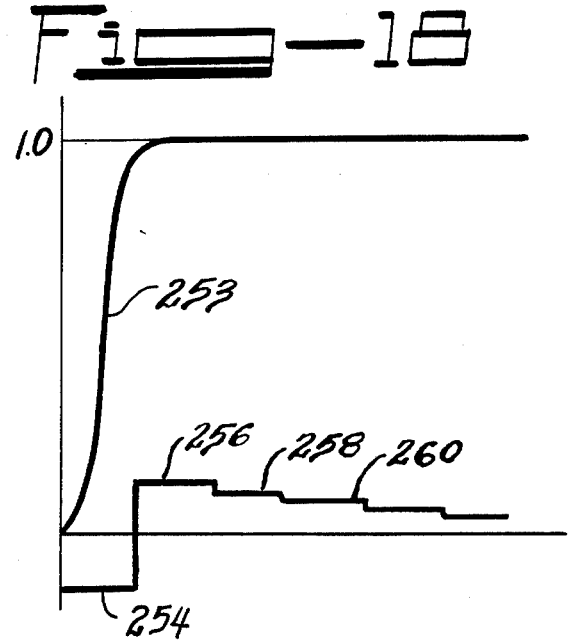

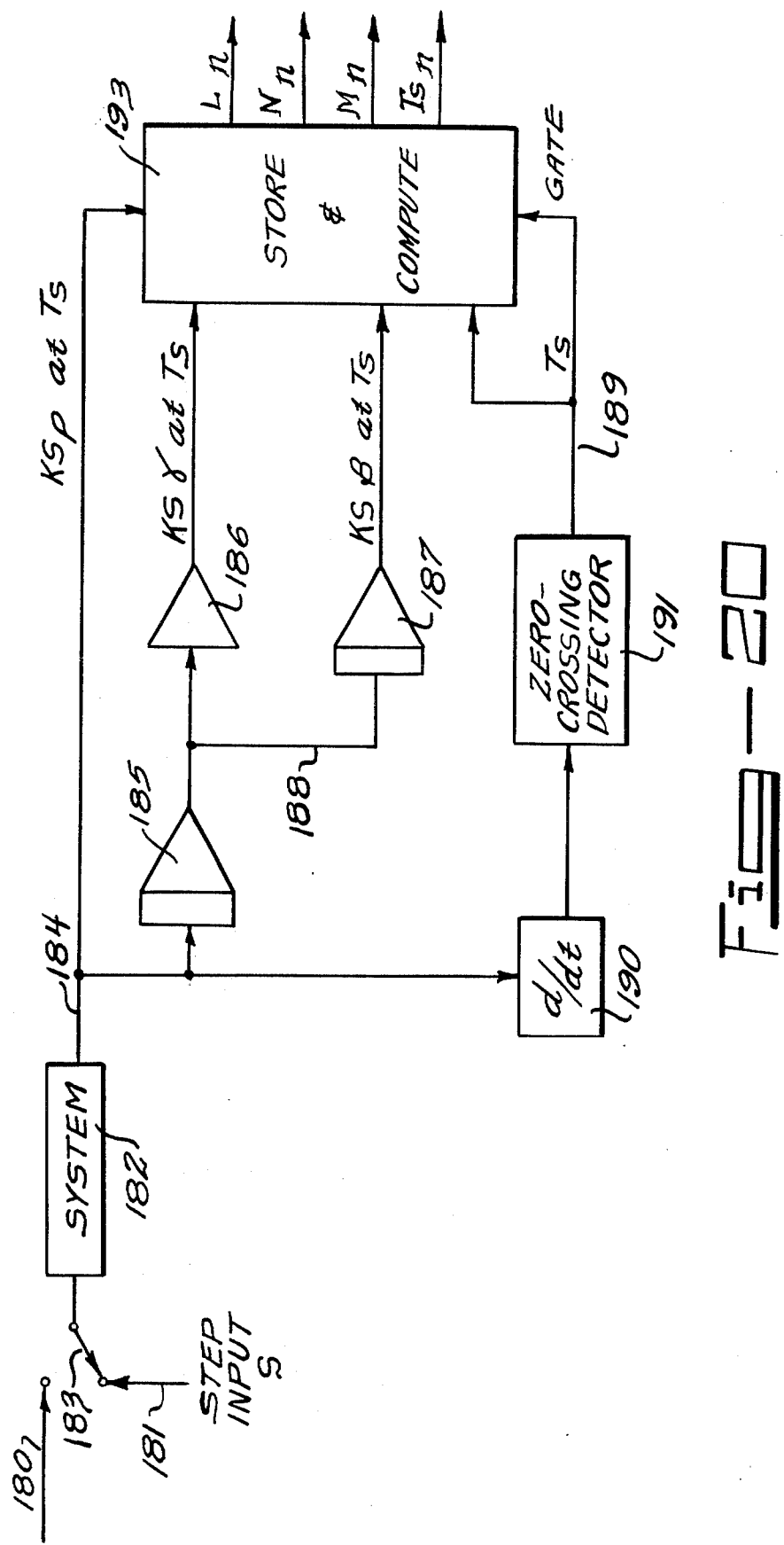

STEP-CONTROL OF ELECTROMECHANICAL SYSTEMS

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

The present invention relates to automatic control systems. It applies both to closed-loop (feedback) systems and to open-loop systems.

A basic problem in the design of automatic control systems is that of speed of response. The designer normally knows the idealized response that is desired from each particular type of input and he frequently works with systems that are sufficiently close to linear to permit the superposition of combined inputs to produce combined responses thereto. However, physical limitations upon the equipment frequently lead to the introduction of delays between the desired output signal and the observed output signal. This is especially true in the case of the linear second-order system which is typical of a wide range of automatic control systems and which provides an adequate descriptive approximation to the performance of still more such systems. The second-order system is describable by a linear differential equation of the second order with constant coefficients. Alternatively, it is characterized in the s-plane by a pair of poles. Such a system may be in one of two conditions: it may be either overdamped or oscillatory, with a dividing line between the two comprising the case of critical damping. The overdamped condition is characterized by a step response that comprises the sum of two exponentials with different time constants. In the s-plane the overdamped condition is represented by two poles on the negative real axis. The exponential having the longer time constant represents a delay between the actual value and the final value of the output that is often undesirable from the standpoint of the designer. Typically the designer would like to see a close approximation to a step output in response to a step input. However, if he varies system constants to vary the location of the poles in an overdamped system so as to reduce the time constant of the dominant exponential term, he approaches more closely the oscillatory condition which may be undesirable for a number of reasons. For example, nonlinearities in the system may tend to sustain any oscillations that are started. The relocation of poles or, in other words, the variation of the time constants of exponentials in the step response of the linear second order system thus involves compromises that may have undesirable results. It would be useful to have a system for controlling response to a step input that does not require a change in the damping of the system.

It is not always desirable to have an overdamped system. Sometimes a designer makes the choice of a system exhibiting an underdamped or oscillatory response. Such a system responds to a step input by overshooting the final value and oscillating with a damped oscillation about this final value. The amount of the overshoot and the frequency and rate of damping of the oscillation are functions of the system parameters. Two commonly applied figures of merit for systems that exhibit overshoot are the peak overshoot and the settling time. The peak overshoot is often expressed on a percent or a per unit basis as a measure of the ratio of the height of the first overshoot above the final value to the height of the final value for a step input. The settling time is defined as the time required for oscillations to decrease to a specified absolute percentage of the final value and thereafter remain less than this value. It is common to specify the allowable percentage as 2% or 5%. These figures are arbitrarily chosen design criteria. Each provides a figure of merit in comparing systems for their ability to produce a desired output from a given input. Generally speaking, rapid response of a system to a changing input is assocated with oscillations about the final value following the change and slowness of response is associated with increased damping that removes such oscillations. In a linear system and, to a lesser degree, in nonlinear systems, part of the design problem includes a compromise between the desired degree of rapidity of response and the tolerable amount of oscillation about a final value.

The foregoing discussion has been cast primarily in terms of a so-called type-zero system. This is a system in which the steady-state response to a step input is a constant value. Such a system follows a ramp input with an error that increases in time and similarly produces an infinite steady-state error in response to a parabolic input. The same conclusions, though, hold for systems characterized by higher type numbers. For example, the type-one system has a step response that provides zero error in the steady state and provides a constant error in the steady state in response to a ramp input. The type-two system produces zero steady-state error in response to both a step and a ramp input and produces a constant error in response to a parabolic input. It can be seen by inspection that increasing the number of the system type increases the amount of integration in the circuit and thereby enables the circuit to follow a higher-order input signal. These systems have in common the fact that selection of the system parameters and determination of whatever compensation may be necessary in either a forward loop or a feedback loop determines the response of the system to any given class of signals. Improvement of this response in one area generally results in deterioration in another area. For example, improving the speed of response generally produces an increase in any oscillation that exists about the final value and hence increases the time necessary to produce settling within a given percent variation from the final value.

One method of overcoming the disadvantages inherent in dealing with a fixed-parameter control system is to condition the input signal to the system. The general result of such a process is to produce in the conditioning signal a correction value that is a function of the signal itself. Such a signal is also a function of the system constants. The method of generating and applying such signals will require information as to current input signals and it must be based upon the parameters of the system.

It is an object of the present invention to improve the performance of control systems.

It is a further object of the present invention to produce a modified signal to replace the input signal to a control system so as to result in improved response.

It is further object of the present invention to provide a corrective signal to add to the input signal to a system to provide an improved response to the original signal.

It is a further object of the present invention to provide an improved response for sampled-data control systems.

It is a further object of the present invention to provide means for calculating and applying a corrective signal to be added to the signal present in a sample-data control system to provide an improved response of the system.

It is a further object of the present invention to provide means for calculating a signal correction that can be varied from time to time as system parameters change to produce a modified signal to supplement the input signal to the system and thus provide an adaptive version of improved system response.

It is a further object of the present invention to provide means allowing the use of underdamped systems and systems having high gain while maintaining stability of the system by calculating correction signals to be added to or used to supplement the input signals to the system to provide improved system response.

It is a further object of the present invention to provide an improvement in the response of an open-loop system by calculating a correction signal to be used in conjunction with the input signal to the open-loop system.

Other objects of the invention will become apparent in the course of the detailed description of the invention.

SUMMARY OF THE INVENTION

The response of an automatic control system is improved by applying a test signal to the system, measuring the response of the system, and calculating therefrom a series of correctional constants according to a predetermined scheme. The correctional constants are applied to generate from a random system input a correctional signal to be added to the random system input. The sum of the random system input and the correctional signal provides a system response that is improved over the response obtained in the absence of the correctional signal.

BRIEF DESCRIPTION OF THE DRAWINGS

FIG. 9 is a block diagram indicating a feedback system not embodying the principles of the present invention.

FIG. 10 is a block diagram of a feedback system including a signal processor according to the present invention.

FIG. 16 is a time plot of the step response of a system with overshoot.

FIG. 17 is a time plot of the uncorrected step response of a typical multipole system.

FIG. 18 is a time plot of the correctional signals and the corrected response for the system that produced the response of FIG. 17.

FIG. 19 is a block diagram of the elements necessary to generate a correctional signal using a digital computer.

FIG. 20 is a block diagram of a circuit for determining corrective quantities.

DETAILED DESCRIPTION OF THE PREFERRED EMBODIMENT

Figure 1:
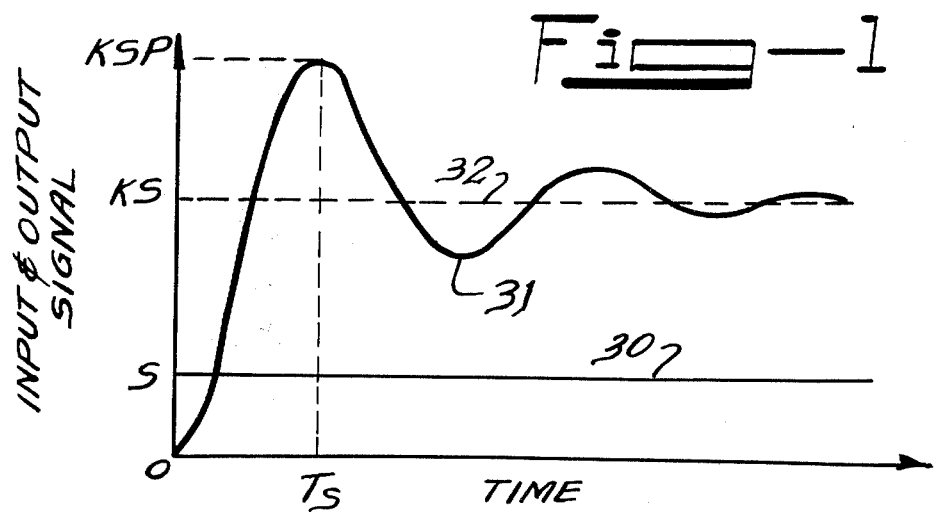
FIG. 1 is a time plot of a step input signal and the response of an underdamped second order system to the step.

The present invention comprises a method and means of improving the response of a control system to a general input signal. The problem to be overcome is indicated in various curves showing typical inputs to conventional systems and typical forms of the response thereto. FIG. 1 shows an input step 30 having amplitudes. Curve 31 is a typical characteristic showing the response to such an input step as observed at the output of a second-order system. Curve 31 reaches a peak value of amplitude KSP at time $T_s$ and thereafter oscillates with decreasing amplitude about final value KS. One figure of merit applied to compare different designs of control systems is the time taken to achieve and maintain a response within a stated percentage of the final value in response to an input step. The present invention comprises a method for causing the system to achieve its final value at time $T_s$ in response to a step input. This can be seen to be an improvement over the response indicated as curve 31.

Figure 2:
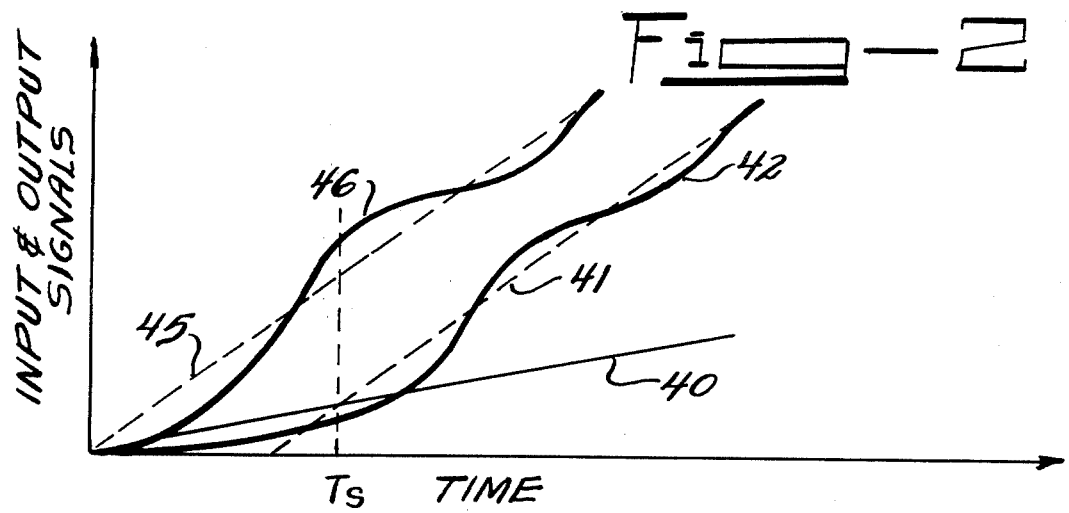
FIG. 2 is a time plot of a ramp input signal and representations of the responses of two different typical systems to a ramp input signal.

FIG. 2 is a curve showing a ramp signal and the response to it. In FIG. 2, curve 40 represents a typical ramp input signal. Typical forms of the response exhibited by control systems to an input signal such as curve 40 are indicated in response curves 42 and 46. Response 42 is that of a type-zero system. It indicates oscillation about a final value represented by displaced ramp 41. Response curve 46 is that of a type-one system. It exhibits an oscillation about ramp 45 which can be taken as the desired output ramp response. The principles of the present invention permit the achievement of the ideal ramp output in response to a ramp input.

Figure 3:
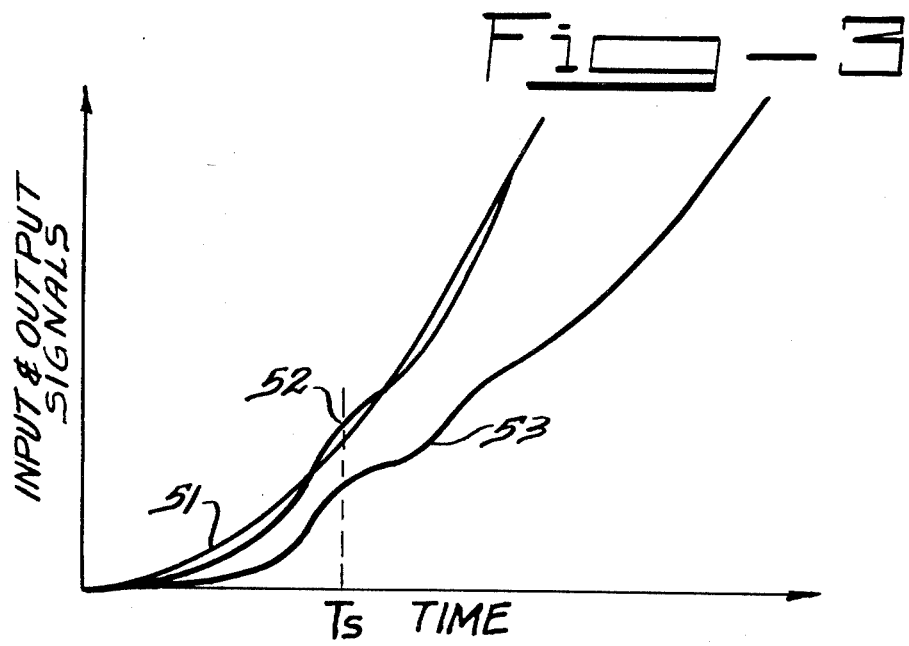
FIG. 3 is a time plot of a parabolic input signal and the response of two control systems to the parabolic input signal.

FIG. 3 represents a parabolic input to a control system, curve 51. Two possible response curves are indicated. Curve 53 represents an output of a type-one system. Curve 53 oscillates about a parabola with increasing steady-state error as time increases. Curve 52 represents a response curve typical of a type-two system, oscillating with decreasing error about the parabola which represents ideal response. The principles of the present invention permit the system to achieve the desired parabola without deviation.

Figure 4:
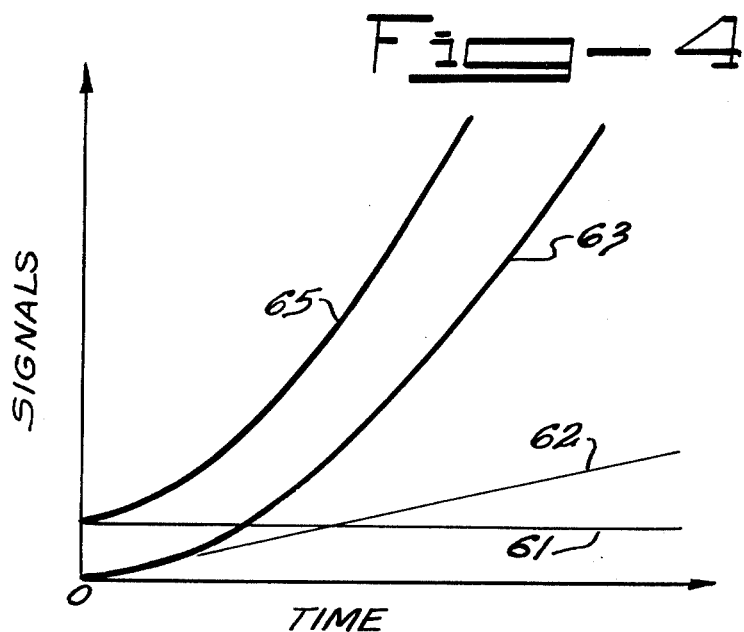
FIG. 4 is a time plot of a number of input signals and an example of their combination into a more complicated signal.

FIG. 4 represents a composite general input signal, composite curve 65 and the components that go to make up such a signal. The components are step 61, ramp 62 and parabola 63. The sum of curves 61, 62 and 63 is composite curve 65, which can also be considered the first three terms of the Taylor's series for a general input curve. A system which gives improved response to composite curve 65 can be expected to provide a correspondingly improved response to the large majority of signals that are likely to be applied to a physical system.

Figure 5:
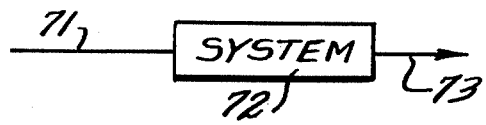
FIG. 5 is a simplified block diagram of a system that does not use the method of the present invention.

Turning now from signals to systems, we see in FIG. 5 a conventional representation of an open-loop control system. Input signal 71 is applied to system 72 which produces therefrom output 73. The term "open-loop" is conventionally applied to indicate the fact that there is no explicit connection between output signal 73 and input signal 71 in the reverse direction. The principles of the present invention are applied in the form of a block diagram in FIG. 6. Input signal 81 is there applied to signal processor 82. Signal processor 82 generates modified input signal 83. This is applied to system 84, producing therefrom output 85. The operations performed by signal processor 82 are dependent upon the parameters of system 84 and upon the form of input signal 81. The result of the operation of signal processor 82 is to generate a modified signal 83 that causes a more nearly ideal response of system 84 than the response that would have been achieved by applying input signal 81 directly to system 84.

Figure 7:
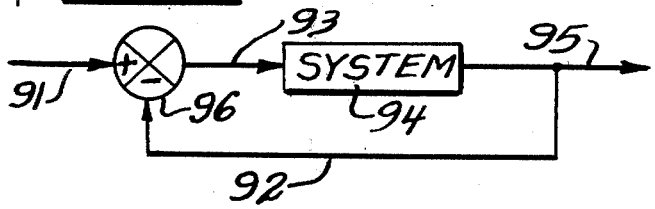
FIG. 7 is a block diagram representing a unity feedback control system not embodying the present invention.
Figure 8:
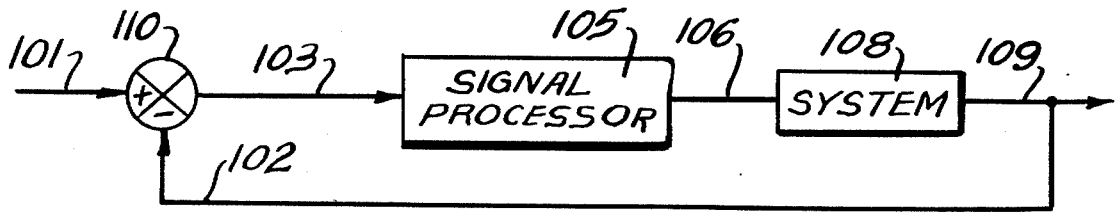
FIG. 8 is a block diagram of a unity feedback control system employing a signal processor for the practice of the present invention.

FIGS. 7 and 8 comprise a conventional unity feedback system and the same system showing application of the principles of the present invention. FIG. 7 is the conventional unity feedback system. Summer 96 receives input signal 91 and feedback signal 92. The difference of these signals is error signal 93, which is applied to system 94 to achieve response 95. FIG. 8 comprises the modification of FIG. 7 according to the principles of the present invention. In FIG. 8, input signal 101 and feedback signal 102 are applied to summer 110 and the difference is error signal 103. This is applied to signal processor 105 which applies the methods of the present invention to produce modified error signal 106. System 108 receives modified error signal 106 and generates therefrom output 109. Signal processor 105 produces an output that is a function both of the characteristics of system 108 and of error signal 103. The modified error signal 106 that is produced is capable of providing a response that is improved over the response that would be produced without such signal processor.

FIGS. 9 and 10 show a general feedback system with and without the application of the methods of the present invention. FIG. 9 is a conventional representation of a general feedback control system. Summer 121 receives input signal 115 and feedback signal 120. Their difference is error system 116, which is applied to signal 117. Output 118 is further modified in feedback elements 119 to produce feedback signal 120. The methods of the present invention are applied to such a system in FIG. 10, in which input signal 131 and feedback signal 138 are combined in summer 139 to produce as a difference error signal 132. This is applied to signal processor 133, which operates according to the principles of the present invention to produce modified error signal 134. This, in turn, is applied to system 135 to produce output 136. Output signal 136 is applied to feedback elements 137 to produce feedback signal 138. As earlier described, the signal processor, in this case signal processor 133, generates a modified error signal 134 that is a function both of the parameters of system 135 and feedback elements 137 and also of error signal 132. The various signal processors, namely 82 in FIG. 6, 105 in FIG. 8 and 133 in FIG. 10, perform the operation that effects the method of the present invention. The mechanism of this operation will be described below.

Dynamical physical systems possess time constants and natural frequencies which cause the systems to fail exactly to follow the forms of input signals. Much of the design effort applied to control systems comprises a process of attempting to shape system parameters to improve in some measure the degree to which the form of the output approximates that of the input. The present invention comprises a method of deriving a set of modified signals based upon the original signal and the parameters of the system to be controlled. The modified signal is applied as a replacement for the original input signal to the system or as a replacement for the original error signal in a feedback system. Proper application of the method of this invention allows ready calculation and generation of a signal that causes the system to achieve an improved response over that generated in response to the original input signal. The method comprises determining sets of five quantities. These are the system gain, K, the percent response at the time $T_s$, P, in response to a step input, the time $T_s$ required to achieve the first peak of the output in response to a step input, the percent response U of the output at time $T_s$ in response to an input ramp signal, and the percent response W at time $T_s$ in response to a parabolic input signal. Three of the preceding quantities either appear in or can be obtained from the output signal 31 shown in FIG. 1. The time to the first peak is indicated in FIG. 1 as $T_s$, and the peak overshoot KSP is seen in FIG. 1 as the peak value achieved by output signal 31 at time $T_s$. It is possible to measure or know amplitude S, the height of input step 30, and to measure the asymptotic final value KS which is the height of curve 32. These quantities allow mechanical or other computation of quantities K, P, and $T_s$. Knowing $T_s$, it is a straightforward matter to obtain the amplitude of the appropriate curve 42 or 46 in FIG. 2 and to calculate therefrom the quantity U, the percent output at time $T_s$ in response to a ramp input. Similarly, knowing $T_s$, the quantity W, the percent output at time $T_s$ in response to a parabolic input, can also be determined.

The practice of the present invention now requires calculating correction factors to apply to the input signal to generate a modified input signal to replace the input signal. This will be considered first from the standpoint of illustrating the modifications that take place to the signal. To see this we consider three necessary correction factors defined as follows:

$$N = \frac{1-P}{P}$$
$$L = T_s \frac{1-U}{P}$$
$$M = \frac{\frac{T_s}{2}(1-W) - ULT_s}{P}$$

The calculation of correctional signals for a general input requires the additional determination of the velocity V and acceleration to derive a total correctional signal. This correctional signal, as described above, will add to the input to provide a composite signal that produces a response that more closely approximates the ideal response to the signal. These quantities are used to generate modified input signal R(t) as follows:

$$R(t) = r(t) + SN + VL + aM$$

where r(t) is the original input signal to the signal processor. This modified signal in general represents the original input signal to a step modified by the factor N, added with a sum of steps and ramps and deltas modified by the factor L, added with a sum of steps and ramps modified by the factor M; the values of V and a are:

$$V = dr/dt \text{ and } a = d^2r/dt^2.$$

Figure 6:
FIG. 6 is a block diagram of an open-loop system including a signal processor for the practice of the present invention.
Figure 11:
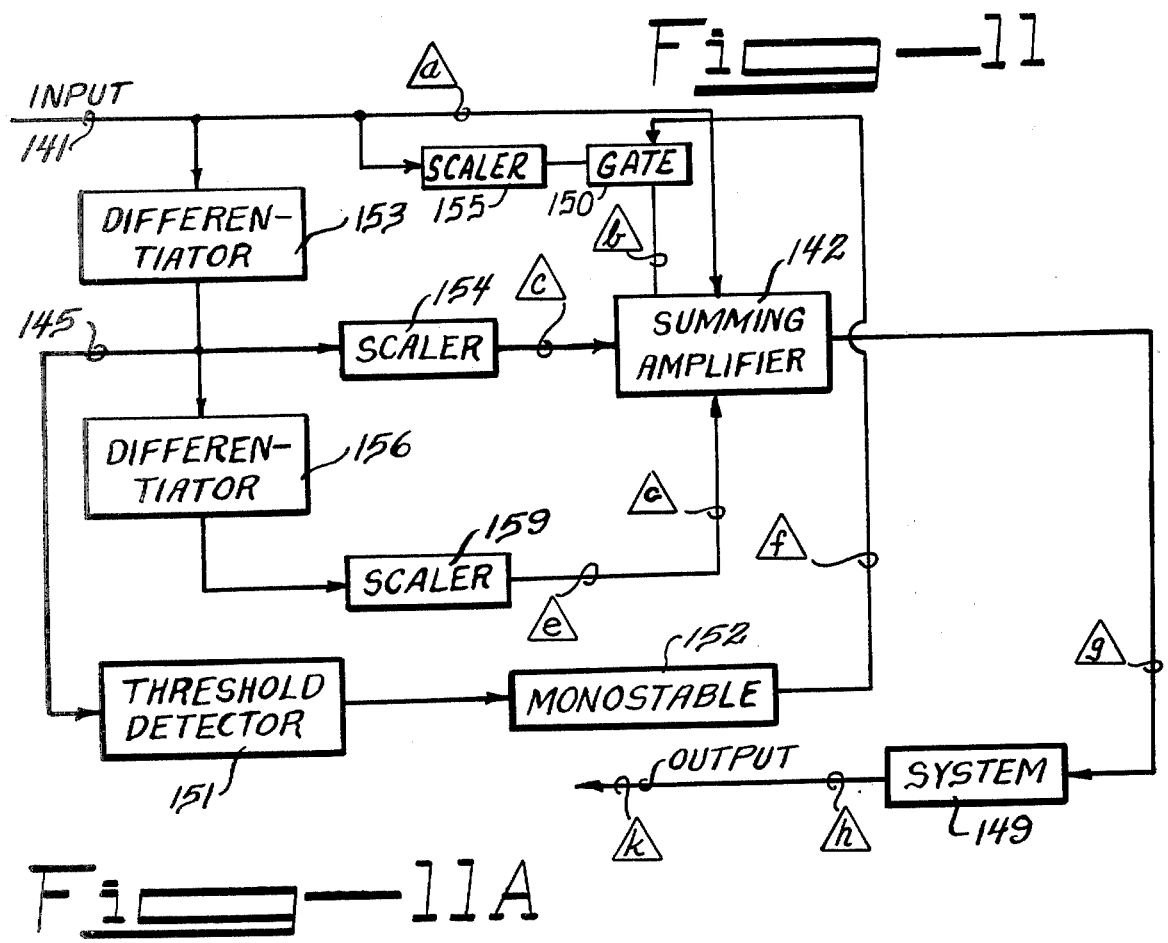
FIG. 11 is an expanded block diagram of the signal processor of FIG. 6.
Figure 11A:
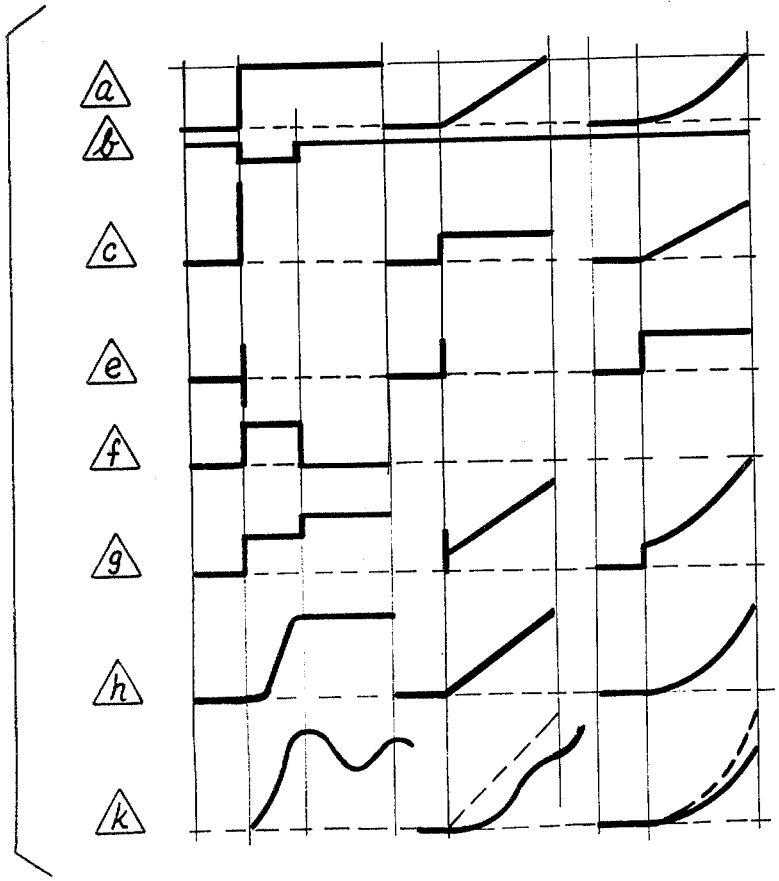
FIG. 11A is a time plot of signals at various points in FIG. 11.

FIG. 11 is a block diagram of an analog version of the signal processor 82 of FIG. 6 for generating the signals necessary to practice the instant invention when it is applied to a system having constant values of N, L, $T_s$, and M. FIG. 11A identifies signals at labeled points of FIG. 11. In FIG. 11A curve k represents the uncorrected output and curve h represents the corrected output. In FIG. 11, input signal 141 is applied to summer 142 and also to first differentiator 153. The output of first differentiator 153 is applied in turn to second differentiator 156. Three scalers receive the signal and the differentiated outputs. Scaler 154 is set to a value equal to L to provide a scaled value of the once-differentiated signal from first differentiator 153. Scaler 155 is set to a value equal to $1-N = 1/P$ to provide a scaled value to the signal. Scaler 159 is set to a value M to be applied to the twice-differentiated signal produced by second differentiator 156. The symbols for scalers 154, 155, and 144 159 are those conventionally used for potentiometers which is appropriate if the values of these constants are less than or equal to 1. If it becomes desirable to use values for these constants that are greater than 1, the scalers can easily be combined with stages of amplification to produce the necessary gain.

The output of scaler 154, that of gate 150, that of scaler 159 and the input signal 141 are combined in summing amplifier 142. Gate 150 has the function of applying its output at time $t=0$ and of removing its output 157 after time $T_s$. This is accomplished by the use of threshold detector 151 which receives first differentiated signal 145 and controls monostable 152 when first differentiated signal 145 exceeds a predetermined threshold limit. Monostable 152 generates a gating square wave for application to gate 150. The result of this combination is that the output of scaler 155 is disconnected whenever there is no output from the threshold detector 151 in response to first differentiator signal 145. When signal 145 exceeds the predetermined threshold, scaler 155 is thus inserted into the circuit to operate on the signal. This scales the input step into the system 149 summing amplifier 142 for a period selected by the length of the output of monostable 152. This length will be chosen to equal $T_s$.

Table I summarizes the response of the second-order system to the modified signal. The weighting function of the system is $$W(t) = \frac{\omega_n^2}{\omega} e^{-\alpha t} \sin \omega t$$

The response to a step s is $$s \int_0^t w(x)\, dx$$

The response to a ramp Vt is $$Vt \int_0^t \int_0^y w(x)\, dx\, dy$$

The response to a parabola $at^2/2$ is $$\frac{at^2}{2} \int_0^t \int_0^z \int_0^y w(x)\, dx\, dy\, dz$$

TABLE IA

| INPUT | MODIFIED INPUT | RESPONSE TO EACH TERM |
|---|---|---|
| $r(t) = \frac{1}{2} at^2$ | $R(t) = r(t)$ | $\frac{1}{2} at^2 - a\tau t + a\tau^2 [1 - \exp(-\alpha t)(\cos\omega t + \delta \sin\omega t)]$ |
| CORRECTIONAL TERMS | | $+ \frac{a\tau}{\omega_n^2} \frac{\omega_n^2}{\omega} \exp(-\alpha t) \sin\omega t$ |
| L dr/dt = a$\tau$t | | |
| M $d^2r/dt^2$ = a/$\omega_n^2$ | | |
| | | $- \frac{a}{\omega_n^2} [1 - \exp(-\alpha t)(\cos\omega t + \delta \sin\omega t)]$ |
| | + L dr/dt | $+ a\tau t - a\tau^2 [1 - \exp(-\alpha t)(\cos\omega t + \delta \sin\omega t)]$ |
| | | $- \frac{a\tau}{\omega_n^2} \frac{\omega_n^2}{\omega} \exp(-\alpha t) \sin\omega t$ |
| | + M $d^2r/dt^2$ | $- \frac{a\tau}{\omega_n^2} [1 - \exp(-\alpha t)(\cos\omega t + \delta \sin\omega t)]$ |
| | | TOTAL RESPONSE = $\frac{1}{2} at^2$ |

TABLE IB

RAMP INPUT

| INPUT | MODIFIED INPUT | RESPONSE TO EACH TERM |
|---|---|---|
| $r(t) = Vt$ | $R(t) = (t)$ | $Vt - V\tau[1 - \exp(-\alpha t)(\cos\omega t + \delta\sin\omega t)]$ |
| CORRECTIONAL TERMS | | $-V/\omega_n^2 \, \omega_n^2/\omega \exp(-\alpha t) \sin \omega t$ |
| $L \, dr/dt = V$ | | |
| $M \, d^2r/dt^2 = V/\omega_n^2$ | | |
| | $+ L \, dr/dt$ | $V\tau[1 - \exp(-\alpha t)(\cos\omega t + \delta\sin\omega t)]$ |
| | $+ M \, d^2r/dt^2$ | $V/\omega_n^2 \, \omega_n^2/\omega \exp(-\alpha t) \sin \omega t$ |
| | | TOTAL RESPONSE = $Vt$ |

TABLE IC

STEP INPUT

| INPUT | MODIFIED INPUT | RESPONSE TO EACH TERM |
|---|---|---|
| $r(t) = S$ | $R(t) = S/P$ | $\frac{S}{P}[1 - \exp^{-\alpha(t + \pi/\omega)}\{\cos\omega(t + \pi/\omega) + \delta\sin\omega(t + \pi/\omega)\}$ |
| CORRECTIONAL TERMS | | $= \frac{S}{P}[1 + \exp^{-\alpha\pi/\omega}]\exp^{-\alpha t}\{\cos\omega t + \delta\sin\omega t\}]$ |
| $S\frac{1-P}{P}$, applied | $+ S\frac{P-1}{P}$ | $(S - S/P)[1 - \exp^{-\alpha t}\{\cos\omega t + \delta\sin\omega t\}]$ |
| $0 \leq t \leq T_S$ | (applied for | |
| $T_S = \pi/\omega$ | $t \geq T_S$) | |
| | TOTAL RESPONSE | $= S + [\frac{S}{P}(1 + \exp^{-\alpha\pi/\omega}) - S]\exp^{-\alpha t}\{\cos\omega t + \delta\sin\omega t\}$ |
| | $(t \geq T_S) = S$ | $\{\text{since: } 1 + \exp^{-\alpha\pi/\omega} = P\}$ |

The analysis shown in Tables IA, IB, and IC shows that the response to the modified input $R(t)$ is perfectly obtained for ramp and parabolic inputs and is obtained in time $T_s$ after application of a step.

Including the above signal modification unit within a feedback loop most often will cause instability. This is because the open-loop transfer function is changed due to the presence of the signal processor and the feedback transfer function that originally yielded a stable system is no longer appropriate. A sampled signal modification unit may be inserted within a feedback loop without causing instability and its presence will significantly reduce the output error of the system.

Figure 12:
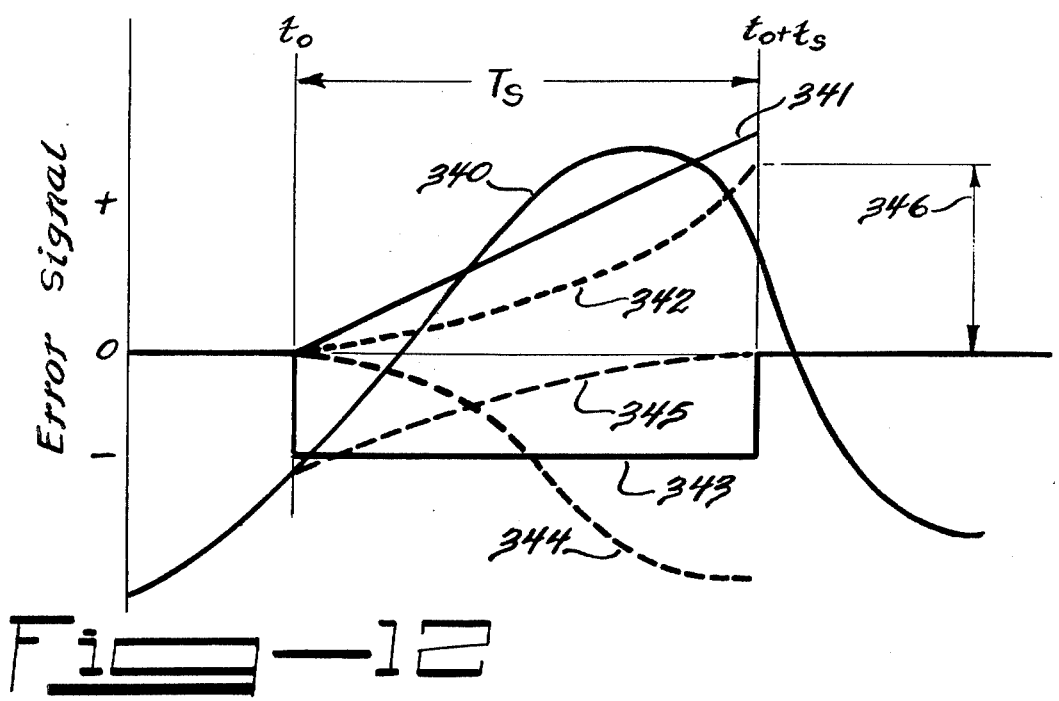
FIG. 12 is a time plot of a signal and of calculated correctional signals and the system response to them.

FIG. 12 is a time plot of an error signal and of calculated correctional signals and the system response to all these signals.

In FIG. 12, an error signal such as that caused by a switching transient is shown as curve 340, which is sampled at $t_0$ and has a magnitude of $\epsilon_0$ and a rate of $\dot\epsilon_0$. With no signal modification the error set at $t_0 + T_s$ will be $\epsilon_0(1-P)$ and $\dot\epsilon_0(1-P)$ shown on curve 340. A ramp, curve 341, beginning at $t_0$ and having the value $Vt$ will yield an output rate $VP$, curve 342, at $t_0+T_s$. (This is true because, since $\epsilon_0 (t_0+T_s)=SP$; $\dot\epsilon_0(t_0+T_s)=VP$, $\ddot\epsilon_0(t_0+T_s)=aP$, due to the time-integral relationships described immediately above.) For this ramp to cancel exactly the error rate at time $t_0+T_s$:

$$VP = \dot\epsilon_0(1-P); \quad V = \dot\epsilon_0(1-P)/P.$$

The ramp will cause an additional error, 346, of magnitude $VUT_s$ and to correct this to zero as well as the error $\epsilon_0(1-P)$, an input step of magnitude $E$, curve 343, is also applied. The response to this signal is shown as curve 344 and has a magnitude $EP$ at $t_0+T_s$ and has zero rate. For the signal magnitude to be zero at $t_0+T_s$ requires $$EP = VUT_s + \epsilon_0(1-P)$$

-continued $$= \frac{\dot\epsilon_0(1-P)}{P} UT_s + \epsilon_0(1-P)$$

whence $$E = \dot\epsilon_0\frac{1-P}{P} \frac{U}{P} T_s + \epsilon_0\frac{1-P}{P}$$

$$= \frac{1-P}{P}\left(\dot\epsilon_0\frac{U}{P} T_s + \epsilon_0\right)$$

$$= N\left(\dot\epsilon_0\frac{T_s - LP}{P} T_s + \epsilon_0\right)$$

Figure 13:
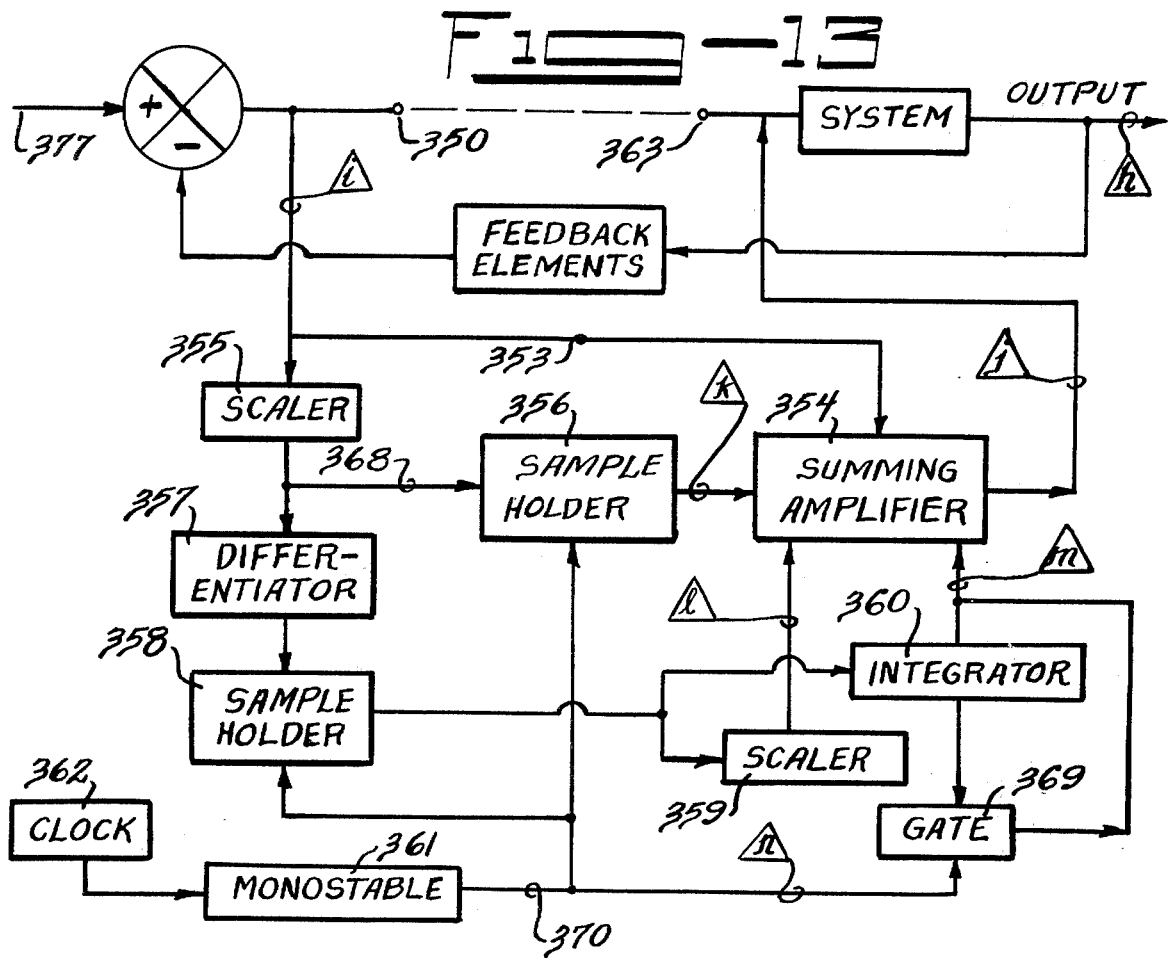
FIG. 13 is an expanded block diagram of the circuit of FIG. 8.
Figure 13A:
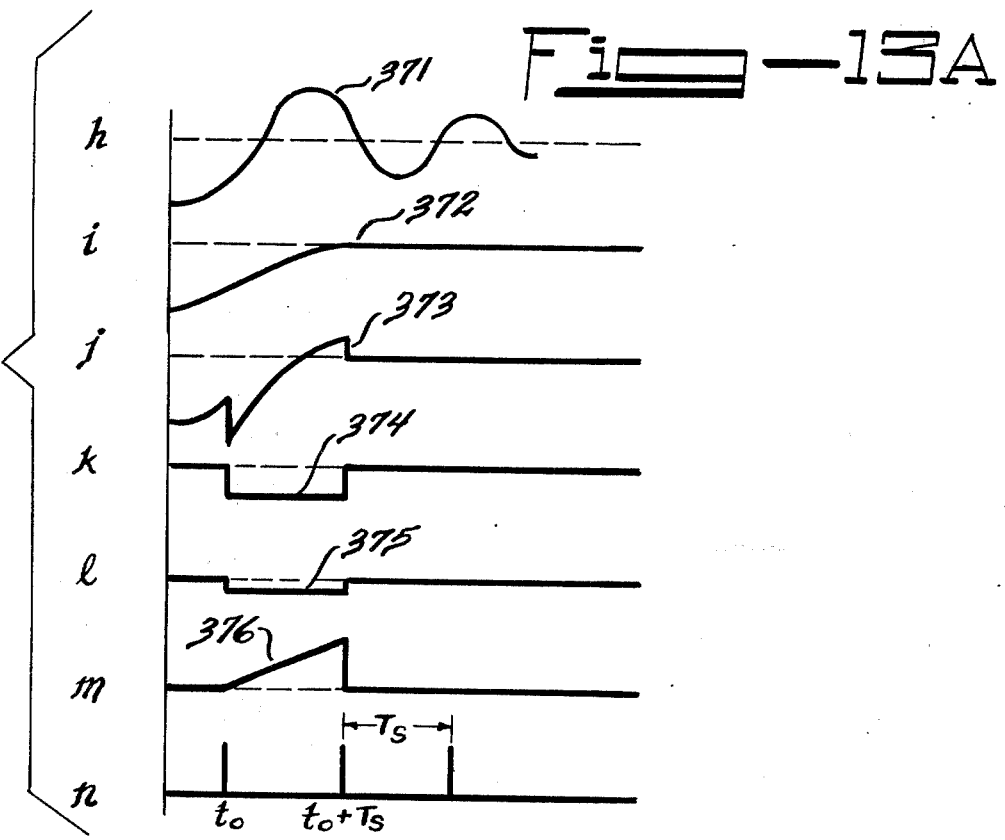
FIG. 13A is a succession of time plots of signals at various points of the circuit of FIG. 13.

Shown in FIG. 13 is a circuit to perform this function, with signals at various points shown in FIG. 13A. In FIG. 13, error signal 353 is fed to summing amplifier 354 and also to scaler 355, scaler 355 being adjusted to a value of $1-N$. Scaler output 368 is fed to sample-hold 356 and to time differentiator 357. The output of sample-hold 356 is fed to summing amplifier 354. The output of time differentiator 357 is fed to sample-hold 358 whose output is fed to scaler 359 and time integrator 360. Scaler 359 is set to a value $((T_s-LP)/P) T_s$ and its output as well as the output from time integrator 360 fed to summing amplifier 354. Signal point 350 and signal point 363 indicate where the system error path was opened to insert the subject signal processor.

Clock 362 causes monostable 361 to generate a pulse train 370 whose pulses are separated by the time interval $T_s$. Signal 370 is fed to sample-hold units 356 and 358 and to electronic switch 369 that serves to discharge the integrator to zero every $T_s$ seconds.

In FIG. 13A, curve 371 is the output error resulting from an initial error, $\epsilon_1$, for operation of the system without use of the present invention. Curve 372 is the output error resulting from an initial error, $\epsilon_1$, sampled for the values $\epsilon_0$, $\dot{\epsilon}_0$ using the present invention. Curve 373 is the modified error signal R(t) which is the sum of error signal 353 and correction signals 374, 375 and 376.

Figure 14:
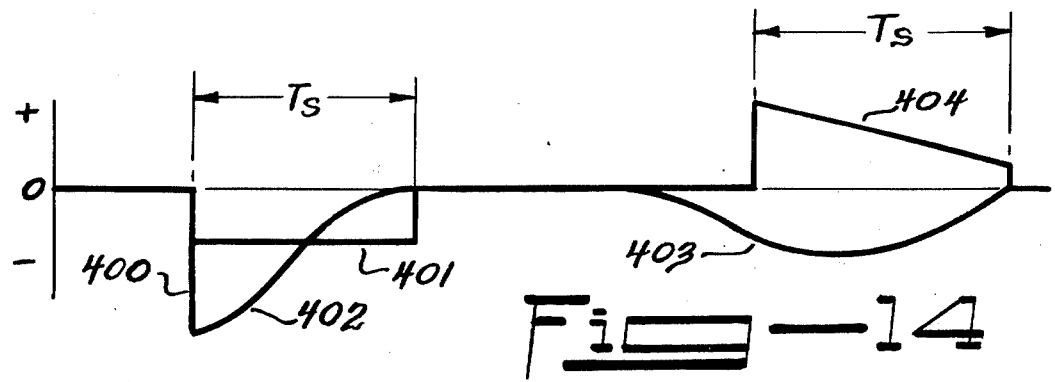
FIG. 14 is a time plot of an error signal and its correction.

Use of the unit of FIG. 13 serves not only to improve system response to input signal 377 but also to rapidly correct for errors due to noise and disturbances both internal and external. This is illustrated in FIG. 14 for operation of a high-voltage power supply. Step error 400 is caused by switching a control demanding a higher voltage. Modification signal 401 then causes the error to be smoothly reduced to zero according to curve 402. The higher voltage causes an arc resulting in error signal 403 which is reduced smoothly to zero by auxiliary signal 404.

Figure 15:
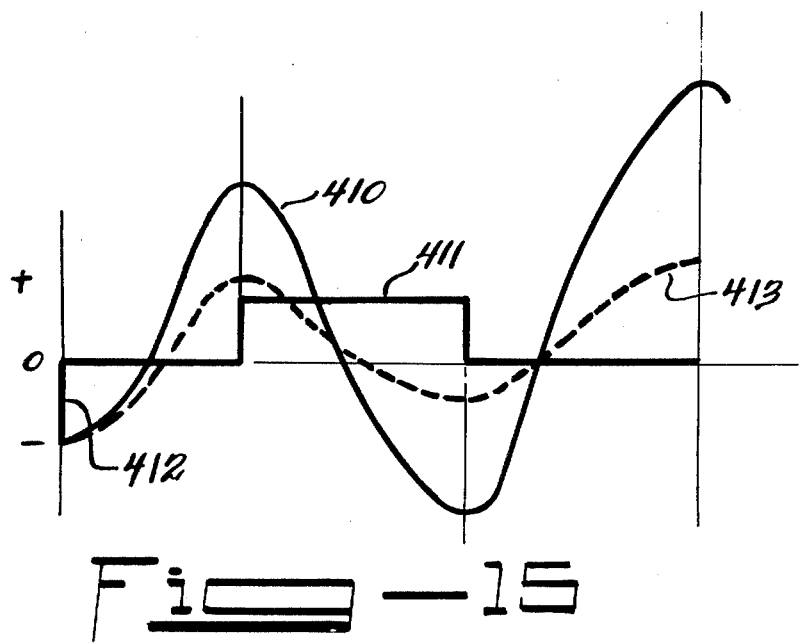
FIG. 15 is a time plot of an error signal in an unstable system and of signals controlling this system.

When a normally stable system becomes unstable due to changing characteristics, the unit shown in FIG. 13 can keep it under control. FIG. 15 depicts the situation. Curve 410 shows an initial error 412, gradually building up to a large oscillation amplitude. When the unit of FIG. 13 is used the error correction signal, curve 411, causes the oscillation amplitude to be kept in control, as shown by curve 413. The unusually large signal 411 can be made to flash a warning light. This operation is potentially very important in the control of massive systems such as large aircraft during flight test, nuclear reactors, etc., where large-amplitude oscillation could lead to destruction or severe damage.

The method of the present invention can be used for improvement of multi-time-constant systems. It is usually advantageous to analyze test results from the measurements of P and $T_s$ to determine the class or type of system. Referring to FIG. 16, for a step input S, the system response overshoots to a value KSP, at time $t_1$, undershoots to a value $KSP_2$ at time $t_2$, overshoots to a value $KSP_3$ at $t_3$, etc. The time intervals $t_1-t_0$, $t_2-t_1$, $t_3-t_2$,—etc. can be measured as can the ratios $(KSP_1-KS)/KS$, $(KSP_2-KS)/(KSP_1-KS)$, $(KSP_3-KS)/(KSP_2-KS)$, etc. If these ratios are all the same and the time intervals equal, the system is identified as a second-order system with no dominant real poles or zeros.

When the ratios are the same but the time interval $t_1-t_0$ is shorter than the time intervals $t_2-t_1$, $t_3-t_2$, etc., and when the time intervals $t_2-t_1$, $t_3-t_2$,—etc. are equal, the system is identified as being a second-order system with a dominant real zero.

When the ratios are not the same and when the time interval $t_1-t_0$ is longer than the succeeding time intervals the system is identified as being a second-order system with a dominant real pole.

These three classes of system cover the vast majority of systems, although application of the present invention is not limited to these systems.

When used to improve the performance of second-order systems having a dominant simple zero, the schemes heretofore described are directly applicable with the only additional requirement being to redefine $T_s$. FIG. 16 shows the response of such a system. In FIG. 16 where the desired response to an input step S is KS, curve 420, the first response peak is at $T_1$, a time interval shorter than $T_2$, $T_3$, $T_4$, etc., which are all equal. The time $T_s$ is defined as the time interval $T_2=T_3=T_4=\ldots NT_s$. This places the amplitude of the response measured to calculate P' at the corresponding value on curve 421. The value P' and values for U and W measured at $T_s$ are then used to determine the proper adjustment of the signal modifier.

When used to improve the performance of second-order systems having a dominant simple pole, the scheme heretofore described can be used with some circuit modification. Referring to FIG. 17, the response, curve 242, is not symmetrical about the desired value, curve 240, due to the long exponential response of the simple pole. The time intervals between successive peaks and nulls are not quite equal. In FIG. 13, if the outputs from circuit elements 356, 359 and 360 are combined in an adder and its output fed through a lead circuit before being applied to the input of summing amplifier 354, the improved performance is achieved. The lead circuit should possess a value:

$$Z=(1/p)P,$$

where p is the value of the simple pole. Alternatively, where computer control is desirable and available, a sequential program can be used.

The practice of the present invention now requires calculating correction factors to apply to the input signal to generate a modified input signal to replace the input signal. This will be considered first from the standpoint of illustrating the modifications that take place to the signal. To see this we consider three necessary correction factors defined as follows:

$$N_N = \frac{1 - P_N - N_1 P_N - N_2 P_{N-1} - \cdots - N_{N-1} P_2}{P_1}$$

$$L_N = \frac{T_N(1 - U_N) - L_1 P_N - L_2 P_{N-1} - \cdots - L_{N-1} P_2}{P_1}$$

$$M_N = \frac{\frac{T_N^2}{2}(1 - W_N) - M_{N-1} P_2 - M_{N-2} P_3 - \cdots - M_1 P_N - L_1 T_N U_N - \cdots - L_2 T_{N-1} U_{N-1} - \cdots - L_N T_1 U_1}{P_1}$$

In these expressions, the subscript refers to the Nth interval of length $T_s$ after time zero. Thus, substituting for the first few integers, $$N_1 = \frac{1 - P_1}{P_1}$$

$$N_2 = \frac{1 - P_2 - N_1 P_2}{P_1}$$

$$= \frac{1 - P_2/P_1}{P_1}$$

$$N_3 = \frac{1 - P_3 - N_1 P_3 - N_2 P_2}{P_1}$$

$$= \frac{1 - P_3/P_1 - P_2/P_1 + (P_2/P_1)^2}{P_1}$$

where $P_N$ is the normalized amplitude of the signal at the Nth interval $T_s$ in response to a unit step input applied at time zero. The quantities $L_N$ and $M_N$ are calculated similarly. These quantities are used to generate modified input signals $R_N(t)$ as follows:

$$R_N(t) = r(t) + s \sum_{n=1}^{N} N_n + v \sum_{n=1}^{N} L_n + a \sum_{n=1}^{N} M_n,$$

where r(t) is the original input signal to the signal processor. This modified signal in general represents the original input signal added to a sum of steps modified by the factor $N_n$, added with a sum of steps and ramps modified by the factor $L_n$, added with a sum of steps modified by the factor $M_n$; the values of v and a are: $v=(dr/dt)$ and $a=(d^2r/dt^2)$. Each modified input $R_N(t)$ is to be applied between the times $T_{N-1}$ and $T_N$ starting with R(t) from zero to $T_1$.

Figure 21:
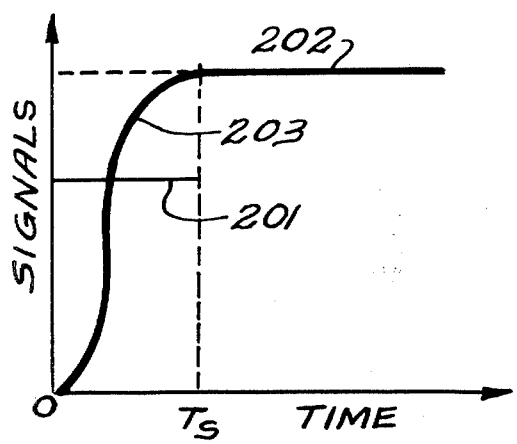
FIG. 21 is a representation of a composite input signal and a corrected output signal.

For the vast majority of systems only two values for N and one each for L and M will be required, namely $N_1$, $N_2$, $L_1$, and $M_1$. Instrumentation for control of these systems will thus be relatively simple to construct and adjust. Systems that possess these characteristics will yield only two values for N, i.e. $N_1$ and $N_2$, and values for L and M that are constant for all values $T_N$. The uncorrected step-function response of such a system is shown in FIG. 1, and the positional control of the system using only $N_1$ and $N_2$ is shown in FIG. 21. The test for the system characteristic is that $N_2=-N_1$.

Step-positional control of a multi-time-constant system where $N_n$ is not zero for n>2 is shown in FIGS. 17 and 18. FIG. 17 is a time plot of the uncorrected step response of a typical multiple-pole system, and FIG. 18 is a time plot of the correction signals and the corrected response for this system. FIG. 17 is taken from J. G. Truxal, "Automatic Feedback Control Synthesis," McGraw-Hill Book Company, Inc., 1955. For the system described by the response of FIG. 17, the application of a unit step at time zero produced the response 240 with a time $T_s$ of approximately 0.4 second. The various values of $P_N$ are then observed from FIG. 17 as follows. $P_1$ occurs at point 242 at a value of 1.17. $P_2$ is at point 244, with a value of 0.79. $P_3$ is at point 246, and has a value of 0.94. $P_4$ is at point 248, with a value of 0.91. $P_5$ is at point 252, with a value of 0.95. Further peaks are closer to the final value, and will be seen to be unnecessary to derive correction signals. The present invention derives corrective signals as now calculated and as shown in FIG. 18 to provide a response that is better than the response shown in FIG. 17. The calculations are as follows. Only values of $N_N$ are calculated, since the input signal is a step, and thus ramp and parabolic correction values are unnecessary. Substitution of the tabulated values for $P_N$ in the expression for $N_N$ provides the following values.

TABLE I

| N | $P_N$ | $N_N$ |
|---|-------|-------|
| 1 | 1.17 | −0.15 |
| 2 | 0.79 | +0.28 |
| 3 | 0.94 | −0.02 |
| 4 | 0.90 | −0.01 |
| 5 | 0.95 | 0 |

The values of $N_N$ are the amplitudes of the steps that must be added to the input step signal to produce the response 253 of FIG. 18. These steps occur at successive intervals of length $T_s$ and are indicated in FIG. 18. Step 254 corresponds to $N_1$, with an amplitude of Table I of −0.15. Step 256 corresponds to $N_2$, with an amplitude from Table I of +0.28. Step 258 corresponds to $N_3$, with an amplitude from Table I of −0.02. Step 260 corresponds to $N_4$, with an amplitude from Table I of −0.01. It is probably unnecessary to calculate $N_N$ for higher values of N, and in fact the first three terms would probably suffice if the total correction were brought to zero. These steps 254, 256, 258, and 260 comprise the corrective signal that must be added to the step that produced the response 240 of FIG. 17. When the corrective signal is added, the response 253 of FIG. 18 is seen to provide a much better approximation to a step than the uncorrected response 240 of FIG. 17.

The particular example shown in FIGS. 17 and 18 necessitated measurement only of S. The need for measurement is a function of the expected form of the input signal. The calculation of correctional signals for a general input requires the additional determination of v and a and calculation of the quantities $L_N$ and $M_N$ to derive a total correctional signal. This correctional signal, as described above, will add to the input to provide a composite signal that produces a response that more closely approximates the ideal response to the signal.

FIG. 19 is a block diagram showing the operational elements necessary to perform the operations required by the present invention using a digital computer. With the set-up shown in FIG. 19, a system can be controlled requiring either constant values for N, L, and M or very complex systems requiring sequential values $N_n$, $L_n$, and $M_n$ can be accommodated. In addition, the control can be expanded in FIG. 19 so as to accommodate systems where $N_n$, $L_n$, and $M_n$ vary with time. It thus is the basis for an adaptive system. The input to FIG. 19 is error signal 171 and its output is modified error signal 177 which is processed for insertion into the system, as has been shown in earlier figures. Analysis unit 172 performs the necessary operations involved in differentiating error signal 171. The assembly unit 173 applies multiplying factors $N_n$, $L_n$, $M_n$, and $T_n$ under the control of memory and control unit 176. The various outputs of assembly unit 173 are applied to summing unit 174 and the output of summing unit 174 is fed to the system. It can be seen that the same operations performed by the analog elements of FIG. 11 are indicated in FIG. 19 as being performed by elements under the control of a digital computer with the additional advantage of being useful with more complicated systems and also with time-varying systems.

The embodiment of the principles of the present invention described above have necessitated knowledge of the quantities N, L, M, and $T_s$. FIG. 20 is a block diagram of a circuit for determining these quantities. In FIG. 20, input signal 180 is the normal input to system 182 selected when switch 183 is in the upper position. Switch 183 is presently indicated in the lower position which applies test step input 181 to system 182. It should be noted that system 182 may be an open-loop system or a closed-loop system and may include the elements of the present invention as a part; for example, system 182 might be FIG. 11 in its entirety. In this case, those portions of FIG. 11 relating to signal processing, namely differentiator 153 and threshold detector 151, would have to be disabled to prevent their operation when the switch was in position to receive test step input 181. With such a test step input applied to the system 182, output 184 is applied to integrator 185, differentiator 190, and store and compute unit 193. Integrator 185 is connected to operational amplifier 186 which inverts the integrated output of integrator 185 for application to store and compute unit 193. Signal 188 is also applied to integrator 187 whose output is also connected to store and compute unit 193. Output 184 is differentiated in differentiator 190 and the differentiated output is then applied to zero crossing detector 191. This provides information in signal 189 which allows computation in store and compute unit 193, enabling the calculation of $T_s$, L, M, and N according to the formulas listed above.

The operations performed by the analog system of FIG. 20 can also be performed by a digital computer with the advantages of rapid analysis and also of being able to more easily accommodate complex systems, as well as time-varying parameter systems. It can be combined with FIG. 19 to make up an adaptive system. With such a set-up, an occasional step input would yield up-to-date values for $N_n$, $L_n$, $M_n$, and $T_n$.

FIG. 21 is a representation of a composite input and a corrected output signal in a typical control system. In FIG. 21, step 201 is the correction signal that has been calculated according to the principles described above. It is applied to the system for a time $T_s$. After time $T_s$ the input signal rises to its final level which is that of step 202. It has been shown earlier that, if the step had been applied initially at the level of step 202, the response would have exhibited either undershoot or overshoot. The response signal 203 in FIG. 21 is seen to exhibit neither of these, but instead climbs to the height of step 202 at time $T_s$ and thereafter remains at the level of step 202. It can be seen from FIG. 21 that the uncorrected system to which steps 201 and 202 have been applied is an underdamped or oscillatory system. This follows because the calculated level of step 201 is below that of step 202. The undesired portion of the signal that is being corrected in FIG. 21 is thus an overshoot. If the system represented in FIG. 21 had instead been an overdamped system, then the necessary correction signals determined by the calculations described above would have caused step 201 to be higher in amplitude than step 202. In either case, the calculations determined as described above provide for the development of a composite correcting signal which provides an optimum response to a unit step as shown in FIG. 21. The correction is complete and the final value is achieved after a time $T_s$.

Figure 22:
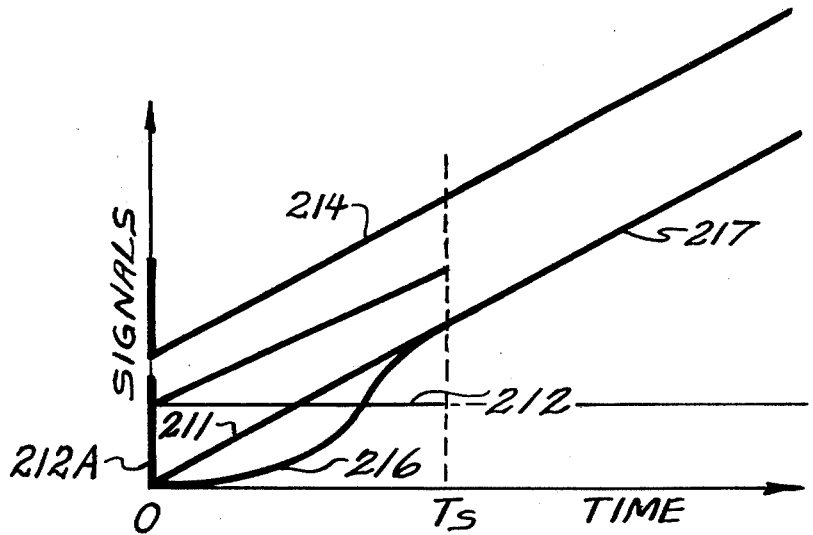
FIG. 22 is a time plot of corrective input signals and the corrected output signal of a system to which a ramp is applied.

FIG. 22 is a time plot of the corrective input signals and the corrected output signal of a system to which a ramp is applied. The system whose response is shown in FIG. 22 has a characteristic time $T_s$ which is calculated as described earlier and is shown on the time axis in FIG. 22. In FIG. 22, ramp 211, step 212, and delta function 212A are applied as inputs. Ramp 211 is itself the known varying portion of the signal applied to the system. Step 212 and delta function 212A are calculated as described above to correct the response of the system to achieve its desired final state at time $T_s$. Signal 214 is a composite signal comprising the sum of ramp 211, step 212, and delta function 212A. The response of the system to the inputs described is curve 216. It can be seen from FIG. 22 that curve 216 may depart considerably from ramp 211 at portions of the interval over which both exist, but that as the time approaches $T_s$ curve 216 approaches and joins ramp 211 so that there is no error between curve 216 and ramp 211 after $T_s$. The signal has thus been corrected to eliminate error after the passage of time $T_s$.

For modest ramp rates the response of the system will be perfect between application of the ramp and the time $T_s$ as is detailed in Table IB. For steep ramps the output of second differentiator 156 of FIG. 11 may be insufficient in amplitude, due to saturation of second differentiator 156 or to saturation of system, to provide the correct magnitude of delta-function, curve c, of FIG. 11A demanded by the method. In the limit, when the steepness of the ramp approaches a step function, the response is as detailed in Table IC, and it is physically impossible to achieve perfect response for the time interval between application of the signal and $T_s$ without overdriving the system.

Figure 23:
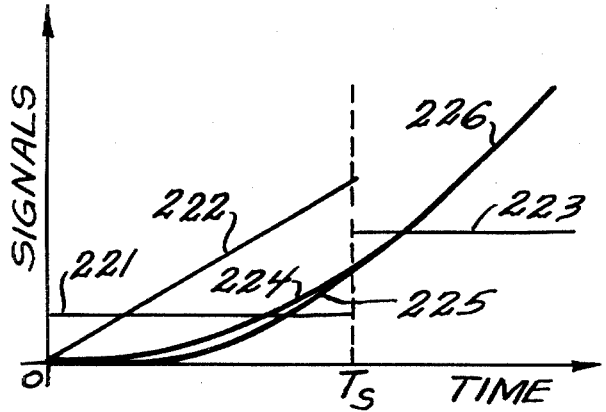
FIG. 23 is a representation of the correction signals and the corrected output signal of a system receiving an input that is a parabola.

FIG. 23 is a representation of the correction signals necessary to apply the principles of the present invention to a system receiving an input that is a parabola. In FIG. 23, step 221 and ramp 222 are correctional signals calculated according to the principles described above. Input parabola 224 is the signal that it is desired that the system follow. Response signal 225 is seen to be coincident with input parabola 224 as a result of application of the calculated correctional signals, step 221 and ramp 222, during the period $T_s$ (see Table IA).

A system for the practice of the present method has been used at the Argonne National Laboratory to achieve improved response of a control system for a calorimeter measuring the activity of nuclear-fuel rods. The calorimeter is the subject of U.S. Pat. No. 3,995,485, entitled "Dry, Portable Calorimeter for Nondestructive Measurement of the Activity of Nuclear Fuel." A control system responded to an error signal proportional to temperature to maintain the temperature of an oven within 20 microK, and measurement of the power necessary to maintain this temperature gave a measure of the heat generated by radioactive materials. Such a control system must approach a final value rapidly to be of use, and it must avoid overshoot to prevent the "lock-up" characteristic of a thermal system that can be driven by heat but not actively cooled. The application of the method of the present invention reduced the time to obtain acceptable readings by a factor of three, and also reduced significantly the standard deviation of successive error readings.

The embodiments of the invention in which an exclusive property or privilege is claimed are defined as follows:

1. A method of improving the response of an automatic control system to a general input signal that is a function of time, the method comprising:
   a. applying a test input signal to the system;
   b. obtaining a test output signal corresponding to the test input signal;
   c. determining values of correctional quantities from the test output signal according to a predetermined scheme;
   d. generating correctional signals from the correctional quantities;
   e. adding the correctional signals to the general input signal to obtain a modified input signal; and
   f. applying the modified input signal to the system.

2. The method of claim 1 wherein the test input signal comprises a step signal.

3. The method of claim 2 wherein determining values of correctional quantities comprises the following steps:
   a. determining system gain K;
   b. determining time $T_s$ required to achieve a first peak of an output signal in response to the unit step input signal;
   c. determining percent response P at the time $T_s$ in response to the unit step input signal;
   d. determining percent response U at the time $T_s$ in response to a unit ramp input signal;

e. determining percent response W at the time $T_s$ in response to a unit parabolic input signal;

f. calculating a quantity $N=(1-P)/p;$ g. calculating a quantity $L=T_s(1-U)/P;$ h. calculating a quantity $$M = \frac{\frac{T_s}{2}(1-W) - ULT_s}{P};$$

i. measuring amplitude S of the general input signal at a test time;

j. measuring time rate of change v of the general input signal at the test time;

k. measuring second time derivative a of the general input signal at the test time; and l. calculating the quantity $SN+vL+aM$, which quantity has a value equal to the value of the correctional signal.

4. A method of improving the response of a feedback control system having an error signal to a general input signal that is a function of time t, the method comprising:

a. applying a test input signal to the system;
b. determining a test error response to the test input signal;
c. determining values of correctional signals from the test error response according to a predetermined scheme;
d. generating correctional signals equal to the determined values;
e. adding the correctional signals to the error signal to obtain a modified error signal; and
f. applying the modified error signal to the system to replace the error signal.

5. The method of claim 4 wherein the test input signal is a step.

6. The method of claim 5 wherein the step of determining values of correctional signals comprises:

a. determining a system gain K;
b. determining a time $T_s$ required to achieve a first peak of an output signal in response to the test step input signal;
c. determining a percent response P at the time $T_s$ in response to the test input signal;
d. determining percent response U at the time $T_s$ in response to a unit ramp input signal;
e. determining percent response W at the time $T_s$ in response to a unit parabolic input signal;
f. determining a quantity $N=(1-P)/P;$ g. determining a quantity $L=T_s(1-U)/P;$ h. measuring a value $\epsilon_0$ of the error signal at a time $t_0$;
i. measuring a value $\dot{\epsilon}_0$ of the time rate of change of the error signal at the time $t_0$;
j. determining a quantity $$D = \epsilon_o \frac{(1-P)}{P} = N\dot{\epsilon}_o;$$

k. determining a quantity $$E = N\left[\dot{\epsilon}_o \frac{T_s - LP}{P} + \epsilon_o\right];$$

and
l. determining a quanity $F=E+Dt$, which quantity is the desired correctional signal.

7. The method of claim 5 wherein the step of determining values of correctional signals comprises:

a. determining a time $T_1$ to achieve a first positive peak of an output signal in response to the test step input signal;
b. determining a percent response $P_1$ to the test step input signal at time $T_1$;
c. determining a time $T_2$ to achieve a first relative minimum in response to the test step input signal;
d. determining a percent response $P_2$ to the test step input signal at time $T_2$;
e. determining the quantities $Q_1=(P_1-1),$ $Q_2=(P_2-1)/Q_1,$ and $R_1=(T_2-T_1);$ and f. comparing the values of $Q_1$ with $Q_2$ and $T_1$ with $R_1$.

8. The method of claim 7 comprising in addition the following:

a. finding that $Q_1=Q_2$ and $T_1=R_1$ to establish that the feedback control system is a second-order system without a dominant pole or zero;
b. determining a system gain K;
c. determining percent response U at time $T_1$ in response to a unit ramp input signal;
d. determining percent response W at time $T_1$ in response to a unit parabolic input signal;
e. determining a quantity $N_1=(1-P_1)/P_1;$
f. determining a quantity $L_1=T_1(1-U)/P_1;$
g. measuring a value $\epsilon_0$ of the error signal at a time $t_0$;
h. measuring a value $\dot{\epsilon}_0$ of the time rate of change of the error signal at the time $t_0$;

determining a quantity $$D_1 = \dot{\epsilon}_o \frac{(1-P_1)}{P_1} = N_1\dot{\epsilon}_o;$$

j. determining a quantity $$E_1 = N_1\left(\dot{\epsilon}_o \frac{T_1 - L_1P_1}{P_1} + \epsilon_o\right);$$

and
k. determining a quantity $F_1=E_1+D_1t,$ which quantity is the desired correctional signal to be applied for the time $T_s$.

9. The method of claim 7 comprising in addition the following:

a. determining a time $T_3$ to achieve a second positive peak of the output signal in response to the test step input signal;
b. determining a percent response $P_3$ to the test step input signal at time $T_3$;
c. determining the quantities $$Q_3 = (P_3 - P_2)/(P_2 - P_1)$$

$$R_2 = (T_3 - T_2); \text{ and}$$

d. comparing the values of $Q_3$ with $Q_2$ and of $R_2$ with $R_1$.

10. The method of claim 9 comprising in addition:
a. finding that $Q_3 = Q_2 < Q_1$ and that $R_2 = R_1 > T_1$ to establish that the feedback control system is a second-order system with a dominant real zero;
b. determining a system gain K;
c. determining percent response $U_1$ at the time $R_1$ in response to a unit ramp input signal;
d. determining percent response $W_1$ at the time $R_1$ in response to a unit parabolic input signal;
e. calculating a quantity $$N_0 = (1 - Q_2)/Q_2;$$

f. determining a quantity $$L_0 = R_1(1 - U_1)/Q_2;$$

g. measuring a value $\epsilon_1$ of the error signal at a time $t_1$;
h. measuring a value $\dot{\epsilon}_1$ of the error signal at the time $t_1$;
i. determining a quantity $$D_0 = \dot{\epsilon}_1(1 - Q_2)/Q_2;$$

j. determining a quantity $$E_o = N_o \left\{ \dot{\epsilon}_1 \frac{R_1 - L_o Q_2}{Q_2} + \epsilon_1 \right\};$$

and
k. determining a quantity $$F_1 = E_0 + D_0 t,$$

which quantity is the desired correctional signal.

11. The method of claim 9 comprising in addition:
a. finding that $Q_2 > Q_1$ and that $R_1 \leq T_1$ to establish that the system is a second-order system with a dominant real pole;
b. inserting a lead circuit in series with the input signal to cancel the pole;
c. determining system gain K;
d. determining a time $T_{11}$ to achieve a first positive peak of an output signal of the system with a lead circuit in response to the test step input signal;
e. determining a percent response $P_{11}$ to the test step input signal at time $T_{11}$;
f. determining a percent response $U_{11}$ at time $T_{11}$ in response to a unit ramp signal;
g. determining a percent response $W_{11}$ in response to a unit parabolic input signal;
h. determining a quantity $$N_{11} = (1 - P_{11})/P_{11};$$

i. determining a quantity $$L_{11} = T_{11}(1 - U_{11})/P_{11};$$

j. measuring a value $\epsilon_{11}$ of the error signal at a time $t_{11}$;
k. measuring a value $\dot{\epsilon}_{11}$ of the time rate of change of the error signal at the time $t_0$;
l. determining a quantity $$D_{11} = \dot{\epsilon}_{11}(1 - P_{11})/P_{11};$$

m. determining a quantity $$E_{11} = N_{11} \left\{ \dot{\epsilon}_{11} \frac{(T_{11} - L_{11} P_{11})}{P_{11}} + \epsilon_{11} \right\};$$

and
n. determining a quantity $$F_{11} = E_{11} + D_{11} t,$$

which quantity is the desired correctional signal for the time interval $T_s$.

12. An apparatus for insertion in cascade with an open-loop system 149 for processing an input signal 141, the apparatus comprising:
a. a summing amplifier 142 receiving the input signal 141 and delivering a summed output signal to the system 149;
b. a first differentiator 153 receiving the input signal 141 and differentiating the input signal 141 with respect to time;
c. a first scaler 154 connected to the first differentiator 153 and the summing amplifier 142, the first scaler 154 receiving a differentiated input signal and delivering a scaled differentiated signal as an input to the summing amplifier 142;
d. a second differentiator 156 connected to the first differentiator 153 to receive the differentiated input signal and produce a twice-differentiated input signal;
e. a second scaler 159 connected to the second differentiator 156 and the summing amplifier 142 to receive the twice-differentiated signal and produce a scaled twice-differentiated signal that is delivered to the summing amplifier 142;
f. a fourth scaler 155 receiving the input signal to produce a scaled inverted input signal;
g. a gate 150 connected to the fourth scaler 155 and the summing amplifier 142 to gate the scaled inverted input signal;
h. a threshold detector 151 connected with the first differentiator 153 to produce a threshold signal in response to the differentiated signal; and
i. a monostable 152 connected to the threshold detector 151 and the gate 150 to control the gate 150 in response to the threshold signal.

13. An apparatus for insertion within a feedback loop of a feedback control system to provide sampled signal modification, the apparatus comprising:
a. a summing amplifier 354 connected between a summer of a feedback system and the system, the summing amplifier 354 receiving as an input an error signal from the summer, the summing amplifier 354 delivering an output to the system;

b. a scaler 355 connected to the summer to receive as an input the error signal from the summer, the scaler 355 producing as an output a scaled error signal;
c. a differentiator 357 connected to the scaler 355 to produce a differentiated scaled error signal;
d. a clock 362 to produce a timing impulse;
e. a monostable 361 connected to the clock 362 and responsive to the timing impulse to produce a timed pulse train;
f. a first sample-holder 358 connected to the differentiator 357 and the monostable 361 to produce a first sample-holder signal controlled by the timed pulse train;
g. a second scaler 359 connected to the first sample-holder 358 and the summing amplifier 354 to deliver a scaled first sample-holder signal as an input to the summing amplifier 354;
h. an integrator 360 connected to the first sample-holder 358 and the summing amplifier 354 to couple an integrated first sample-holder signal to the summing amplifier 354;
i. a gate 369 connected to the monostable 361, the integrator 360, and summing amplifier 354 to discharge the integrator 360 at periodic intervals; and
j. a second sample-holder 356 connected to the scaler 355 the summing amplifier 354, and the monostable 361 to couple a sampled signal from scaler 355 to summing amplifier 354 as timed by monostable 361.

14. An apparatus for improving the response of an automatic control system to a general input signal that is a function of time, the apparatus comprising:
a. means for applying a test input signal to the system;
b. means for determining correctional signals from a response to the test input signal;
c. means for generating the correctional signals;
d. means for adding the correctional signals to the general input signal to produce a modified input signal; and
e. means for applying the modified input signal to the system.

15. An apparatus for improving the response of a feedback control system having an error signal to a general input signal, the apparatus comprising;
a. means for applying a test input signal to the system;
b. means for determining an error response to the test input signal;
c. means for determining values of correctional signals from the error response;
d. means for generating correctional signals equal to the values; and
e. means for adding the correctional signals to the error signal to obtain a modified error signal.

* * * * *